United States Patent
Van Horn et al.

[11] Patent Number: 6,143,234
[45] Date of Patent: Nov. 7, 2000

[54] APPARATUS AND METHOD FOR COOLING PLASTIC CONTAINERS

[75] Inventors: Norm Van Horn, Marietta; Craig P. Davis, Atlanta; Michael Vaughn, Marietta, all of Ga.

[73] Assignee: Ball Corporation, Broomfield, Colo.

[21] Appl. No.: 09/295,654

[22] Filed: Apr. 21, 1999

[51] Int. Cl.[7] .................................................. B29C 49/66
[52] U.S. Cl. ........................... 264/528; 264/532; 425/526; 425/529
[58] Field of Search ............................. 264/28, 528, 532, 264/40.6; 425/526, 529, 143

[56] References Cited

U.S. PATENT DOCUMENTS

| | | | |
|---|---|---|---|
| Re. 28,497 | 7/1975 | Gasmire | 264/28 |
| 3,065,501 | 11/1962 | Gasmire | 264/28 |
| 3,289,248 | 12/1966 | Scott, Jr. et al. | 425/526 |
| 3,661,483 | 5/1972 | Bose | 425/526 |
| 3,666,849 | 5/1972 | Williams et al. | 264/528 |
| 3,783,157 | 1/1974 | Frank | 264/528 |
| 3,910,746 | 10/1975 | Mrusek et al. | 425/526 |
| 4,367,187 | 1/1983 | Fukushima et al. | 264/526 |
| 4,883,631 | 11/1989 | Ajmera | 264/528 |
| 5,018,358 | 5/1991 | Lee et al. | 62/48.1 |
| 5,085,822 | 2/1992 | Uehara et al. | 264/528 |
| 5,101,636 | 4/1992 | Lee et al. | 62/48.1 |
| 5,182,122 | 1/1993 | Uehara et al. | 425/526 |
| 5,229,043 | 7/1993 | Lee | 264/528 |
| 5,292,466 | 3/1994 | van Bonn et al. | 264/528 |
| 5,730,914 | 3/1998 | Ruppman, Sr. | 264/28 |

*Primary Examiner*—Robert Davis
*Attorney, Agent, or Firm*—Locke Reynolds LLP

[57] ABSTRACT

An improvement for a stretch blow molding apparatus, including a cryogenic liquid pulse pump disposed in sealed fluid connection between a cryogenic liquid reservoir and a stretch blow molding machine, a subcooler connected between the reservoir and the pulse pump for supplying cryogenic liquid at a preselected temperature, a vacuum jacket casing disposed generally surrounding a stretch blow rod, the reservoir, and the pulse pump for preventing vaporization of cryogenic liquid prior to delivery into a container, and control means for controlling the pulse pump to deliver a preselected amount of cryogenic liquid into the container through the stretch rod during a predetermined time interval beginning at a preselected time after formation of the container.

20 Claims, 3 Drawing Sheets

APPARATUS AND METHOD FOR COOLING PLASTIC CONTAINERS

BACKGROUND OF THE INVENTION

1. Field of the Invention.

The present invention relates generally to methods and apparatus for cooling plastic containers formed by stretch blow molding of plastic parisons, and more particularly relates to methods and apparatus for cooling plastic containers by introducing cryogenic liquids within such containers soon after their formation.

2. Description of the Prior Art.

Current methods and apparatus for cooling stretch blow molded plastic containers include the use of liquid cooled molds for standard containers and swirled air for heat set containers. In addition, there are known methods and apparatus utilizing cryogenic gases to cool stretch blow molded containers, where cryogenic liquids are vaporized and blown into containers at high pressures of typically between about 25 and 30 bar, thereby cooling the containers through conduction and convection such as described in U.S. Pat. Nos. 4,039,641; 5,229,043; and 5,730,914.

Known methods and apparatus also utilize cryogenic liquids introduced within stretch blow molded containers for purposes of cooling, such as described by U.S. Pat. Nos. 3,065,501; 4,367,187; 4,883,631; 5,018,358; 5,085,822; 5,101,636; and 5,182,122. Such cryogenic liquid methods and apparatus generally do not require the high delivery pressure of methods and apparatus that utilize cryogenic gas to cool stretch blow molded containers, thereby eliminating the need for a muffler system for the consequent loud exhaust gases. Moreover, cryogenic liquid cooling of stretch blow molded containers is more efficient than a cooling utilizing either air or cool gases.

However, despite the availability of such methods and apparatus, there exists a need in the art for methods and apparatus that introduce cryogenic liquid within stretch blow molded containers for cooling, yet are capable of providing a pulse of cryogenic liquid after a preselected time subsequent to formation of the container, in order to provide rapid, uniform and efficient cooling. A pulse of cryogenic liquid is intended to mean a measured quantity of cryogenic liquid at a preselected temperature and preselected pressure delivered during a predetermined time interval.

SUMMARY OF THE INVENTION

In order to aid in the understanding of the present invention, it can be stated in essentially summary form that it is directed to apparatus and methods for cooling plastic containers stretch blow molded from parisons by pulsed delivery of cryogenic liquid within a container.

Generally, the apparatus of the present invention includes a cryogenic liquid reservoir for storing a cryogenic liquid at a defined pressure, a transfer line for transfer of the cryogenic liquid from the liquid reservoir, and a subcooler for maintaining the liquid within the transfer line at a selected temperature. The apparatus further includes a pump assembly connected in the transfer line for moving a measured quantity of the cryogenic liquid through the transfer line at a prescribed rate and at a prescribed time following the blow molding of a container within a blow mold, the transfer line terminating within the blow molded container. The apparatus delivers the measured quantity of the cryogenic liquid at a preselected temperature and pressure to the interior of the blow molded container to rapidly, uniformly, and efficiently cool the container.

More specifically the apparatus of the present invention includes a cryogenic liquid reservoir for storing the cryogenic liquid, and a first pressure control regulator for regulating the pressure in the reservoir and the transfer line. A branch of the transfer line known as a level control line is connected to the subcooler through a level control valve that controls the level of cryogenic liquid within the subcooler. The level of cryogenic liquid within the subcooler is preferably maintained such that the cryogenic liquid bathes the portion of the transfer line passing through the subcooler. The pressure within the subcooler regulates the temperature of the cryogenic liquid within the subcooler, since the cryogenic liquid is held at its inherent boiling point at the prescribed pressure. The pressure within the subcooler is controlled by a subcooler pressure control valve controlling the venting of gaseous cryogen from the subcooler through a vent.

The transfer line continues from the subcooler as a supply line to a cryogenic liquid pulse pump assembly. The cryogenic liquid pulse pump assembly is preferably in the form of a reciprocally movable piston within a cylinder coupled to the transfer line, the cylinder being enclosed within a housing that immerses the cylinder in cryogenic liquid. The cryogenic liquid pulse pump assembly supplies a desired quantity of cryogenic liquid at a preselected temperature and a preselected pressure, as delivered from the subcooler, to a stretch rod assembly including a reciprocable stretch rod mounted to a stretch rod mounting plate of a stretch blow mold apparatus. The delivery of the measured quantity of cryogenic liquid by the pulse pump occurs during a predetermined time interval beginning at a preselected time after formation of the container by the stretch blow molding of a plastic parison. To minimize heating of the cryogenic liquid, a vacuum jacket member is preferably disposed generally surrounding the reciprocable stretch rod, and a vacuum jacket casing is preferably provided generally surrounding the reservoir, the pulse pump, the stretch rod assembly, the subcooler, the transfer line, the return line, the level control line and the supply line.

Control of operation of the apparatus of the present invention is facilitated by a control, such as a programmable logic controller or personal computer, that is connected to the subcooler pressure control valve to control the pressure and temperature of the liquid cryogen. The control is also connected to the pulse pump assembly so that the piston of the pulse pump moves a defined distance thereby delivering a preselected amount of cryogenic liquid into the container through the stretch blow rod during a predetermined period of time beginning at a preselected time after formation of the container.

In use, a parison is placed in a blow mold beneath the stretch rod assembly and a blow nozzle is inserted into the open mouth of the parison. The stretch rod is moved to an extended position through the center of the blow nozzle and inserted into the parison so that the parison is stretched by the stretch rod and inflated by blow air from the blow nozzle, thereby forming a container. Subsequent to the preselected time after formation of the container, the control causes the pulse pump to activate so that it delivers a preselected amount of cryogenic liquid into the container during the predetermined period of time. With the cryogenic liquid at the preselected temperature and pressure, the newly formed container is rapidly, uniformly, and efficiently cooled. Thereafter, the stretch rod is withdrawn from the container to a retracted position, and the container is removed from the blow mold.

One feature of the present invention is the cryogenically cooled pump assembly connected in the transfer line. This feature enables a measured quantity of the cryogenic liquid at a defined temperature to be delivered through the transfer line to the interior of a blow molded container within a blow mold at a prescribed rate and at a prescribed time following the formation of the container within the blow mold.

Another feature of the present invention is the vacuum jacket member generally surrounding the reciprocable stretch rod, and the reservoir, the pulse pump, the stretch rod assembly, the subcooler, the transfer line, the return line, the level control line and the supply line. This feature, together with the temperature control of the subcooler, ensures the delivery of the cryogen as a liquid rather than a cold gas to the interior of the newly formed container within the blow mold.

Additional features and advantages will become apparent to those skilled in the art upon consideration of the following specification, which when taken in conjunction with the drawings, sets forth the preferred embodiment of the present invention. The embodiment of the invention disclosed herein is the best mode contemplated by the inventors for carrying out the invention in a commercial environment, although it should be understood that various modifications can be accomplished within the parameters of the present invention.

DESCRIPTION OF THE PREFERRED EMBODIMENT

Figure 1:
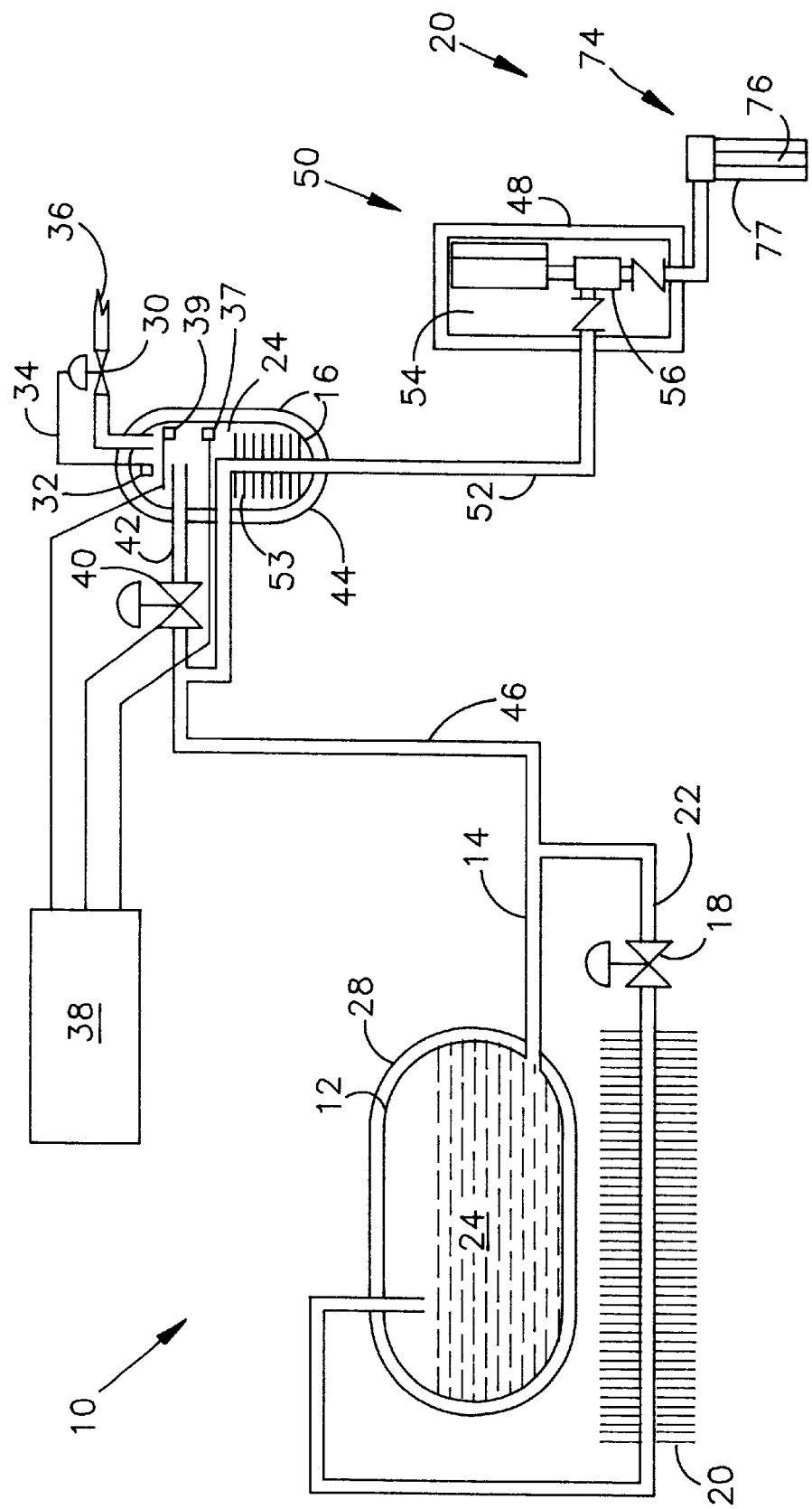
FIG. 1 is a schematic representation of an apparatus for cooling plastic containers in accordance with the present invention.
Figure 2:
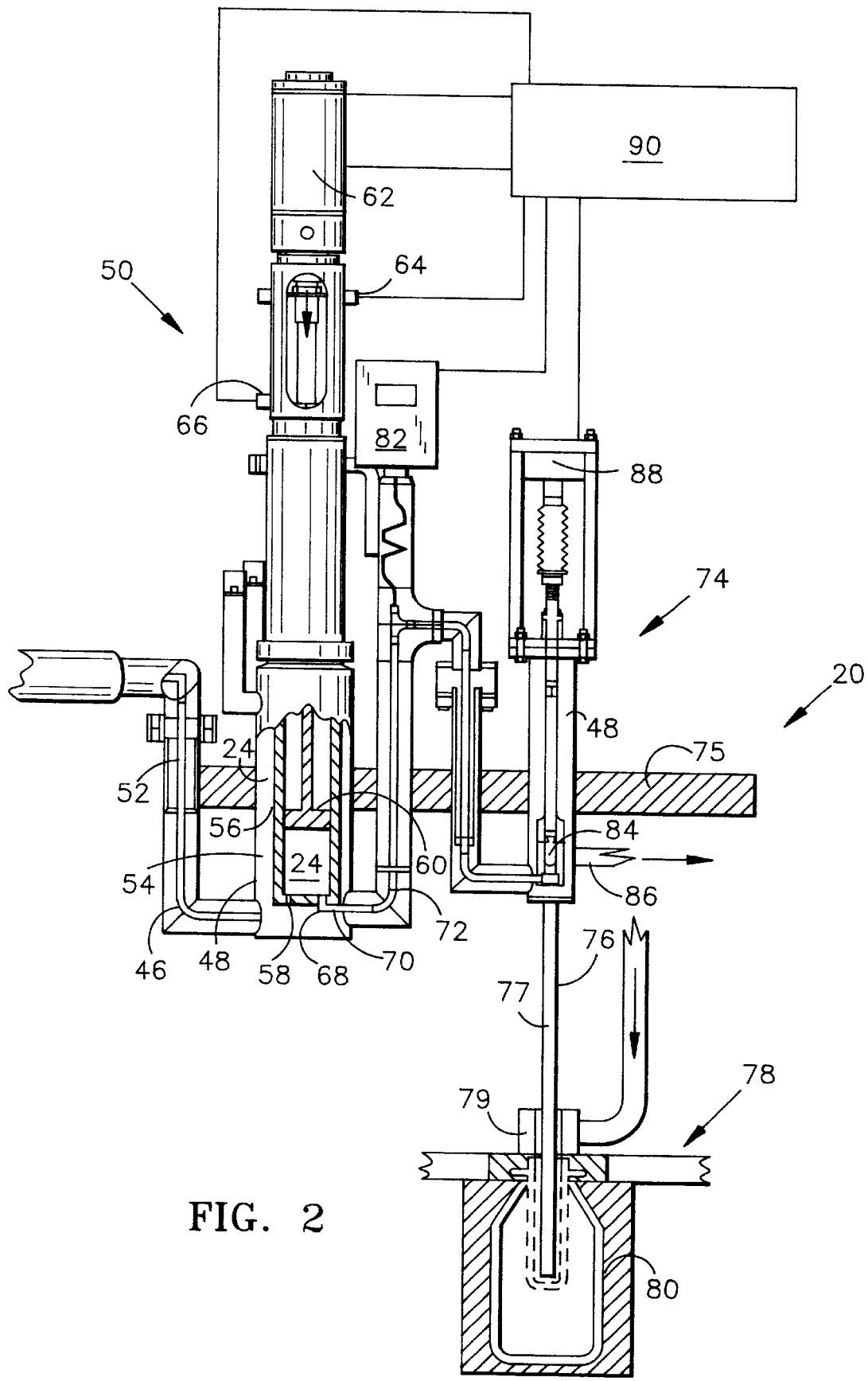
FIG. 2 is a partial cut-away front elevation view of an apparatus for cooling plastic containers representing the present invention, with the stretch rod in the extended position.

The apparatus 10 of the present invention for cooling plastic containers formed by a stretch blow molding apparatus 20 is depicted in FIGS. 1 and 2 to include a cryogenic liquid reservoir 12 for storing a cryogenic liquid 24. The cryogenic liquid 24 is preferably liquid nitrogen, although it will be appreciated that any of a variety of cryogenic liquids, such as liquid Argon, can be utilized within the scope of the present invention. A transfer line 14 is provided to supply the cryogenic liquid 24 from the reservoir 12 to a subcooler 16. A pressure control regulator 18 and a pressure build-up vaporizer 26 connected to a reservoir return line 22 regulates the pressure of the cryogenic liquid 24 within the reservoir 12 and transfer line 14.

The transfer line 14 which supplies the cryogenic liquid 24 from the cryogenic liquid reservoir 12 is connected to the subcooler 16 through a level control line 42 and a level control valve 40. The level control valve 40 is connected to a controller 38 that is also connected to a low level sensor 37 and a high level sensor 39 situated within the subcooler 16. The controller 38 controls the flow of cryogenic liquid 24 through the level control valve 40 and level control line 42 so that an upper surface of the cryogenic liquid 24 within the subcooler 16 is maintained between the low level sensor 37 and a high level sensor 39. A temperature sensor 32 is provided to measure the temperature of the cryogenic liquid 24 within the subcooler 16. A subcooler control valve 30 is connected to sensor 32 by cable 34. The subcooler control valve 30 controls the venting of gaseous cryogen through a vent 36. The subcooler control valve 30 acting under the influence of sensor 32 regulates the pressure within the subcooler 16 and thus the temperature of the cryogenic liquid 24 within the subcooler 16.

Figure 3:
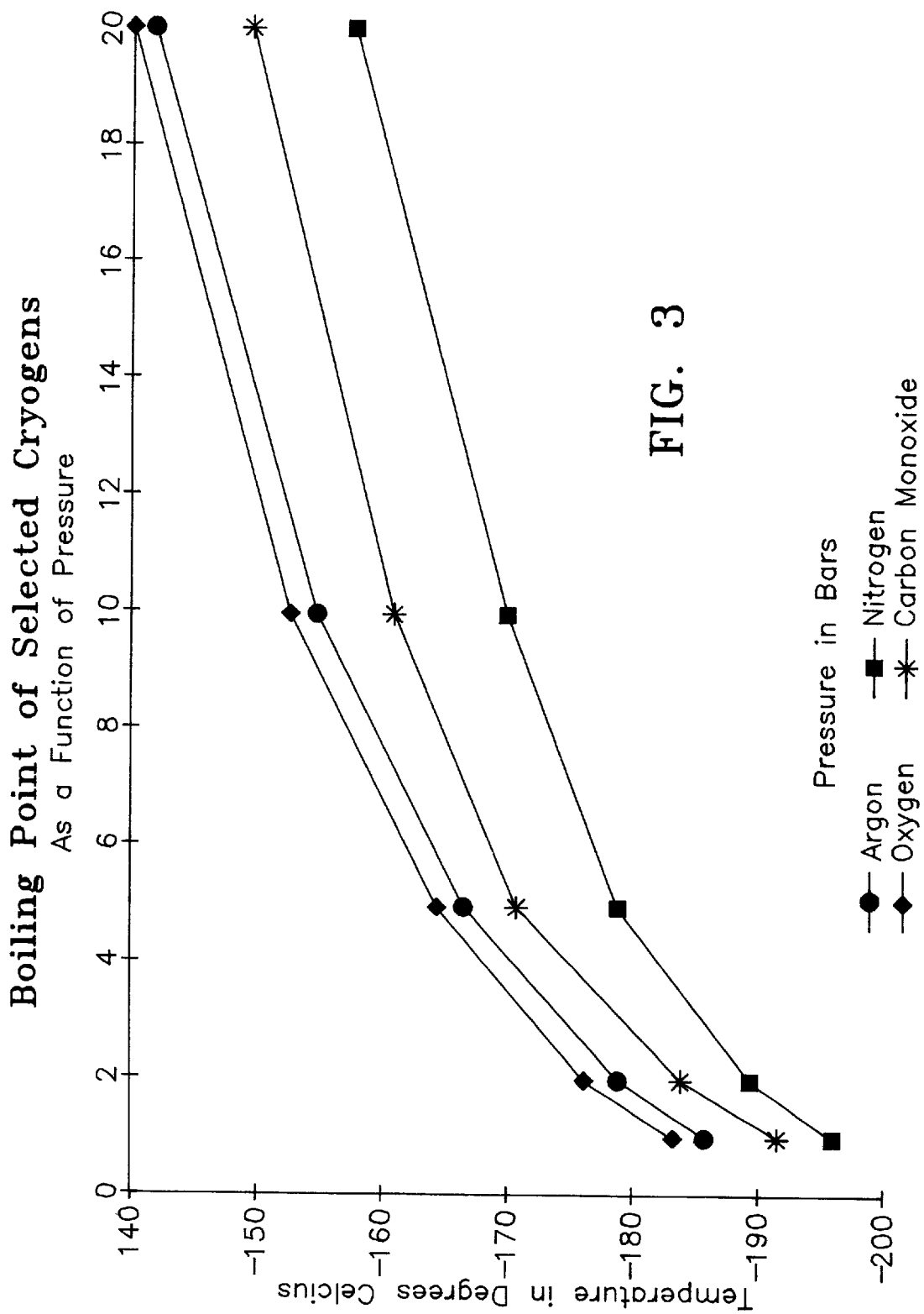
FIG. 3 is graph of the boiling point temperatures of selected cryogenic liquids at various pressures showing the temperature and pressure correlation existing at the subcooler of the present invention.

The relationship between the temperature (in ° C.) of the cryogenic liquid 24 and its pressure (in bar) within the subcooler 16 is shown in FIG. 3 for four selected cryogens. It will be appreciated that due to chemical considerations Nitrogen and Argon are preferred above Oxygen and Carbon Monoxide, and that generally Nitrogen would be preferred due to economic considerations relative to Argon. However, those skilled in the art will appreciate that the apparatus of the present invention is suitable for use with a variety of cryogens and is not limited to the use with liquid Nitrogen.

The transfer line 14 continues as, or is coupled to, a supply line 52 which passes through the subcooler 16 and includes a heat transfer portion 53 located within the subcooler 16. The cryogenic liquid 24 within the subcooler 16 is maintained at a level between sensors 37 and 39 so that the cryogenic liquid 24 within the subcooler 16 bathes the heat transfer portion 53 of the supply line 52 whereby the temperature of the liquid within the supply line 52 is maintained at the temperature of the cryogenic liquid 24 within the subcooler 16.

The supply line 52 is coupled to a pulse pump assembly 50 that in turn is connected to a stretch rod assembly 74, both of which are shown in greater detail in FIG. 2. The pulse pump assembly 50 includes a liquid chamber 54 connected to the supply line 52 that receives cryogenic liquid 24 through the supply line 52. A pump cylinder 56 is situated within the liquid chamber 54 and is immersed in the cryogenic liquid 24 that is maintained at the desired temperature by the subcooler 16. The pump cylinder 56 includes an inlet valve 58 that allows an inward flow of cryogenic liquid from the liquid chamber 54 to the pump cylinder 56. A plunger 60 is situated within the pump cylinder 56 to reciprocate between an upper and a lower position. The plunger 60 is connected to pump air cylinder 62 that drives the plunger 60 between the upper and lower positions. An upper proximity switch 64 can be adjusted to determine the location of the upper extent of movement of the plunger 60 within the pump cylinder 56. The lower extent of movement of the plunger 60 can be determined by a mechanical limit or by an additional lower limit proximity switch 66. Any upward movement of the plunger 60 within the pump cylinder 56 causes cryogenic liquid to be drawn into the pump cylinder 56 from the surrounding liquid chamber 54 through inlet valve 58. Adjusting how far plunger 60 travels upward by means of positioning the upper proximity switch 64 regulates the amount of cryogenic liquid entering the pump cylinder 56. A downward movement of the plunger 60 within the pump cylinder 56 closes inlet valve 58 so that the pressure within the pump cylinder 56 is isolated from the supply line 52 and liquid chamber 54.

The pump cylinder 56 includes an outlet 68, containing an outlet flapper valve 70, that is connected to a delivery line 72 that leads to a stretch rod valve assembly 74. The stretch rod valve assembly is mounted stretch blow rod mounting plate 75 which supports a stretch rod 76 which is vertically movable through the center of a blow nozzle 79 which mates with a blow mold 78 within which is formed a stretch blow molded container 80. A downward movement of the plunger 60 within the pump cylinder 56 opens the flapper valve 70 so that a measured quantity of cryogenic liquid 24 is delivered to the delivery line 72 at a pressure directly related to the air pressure within the air cylinder 62. The relationship between the cyrogenic liquid pressure and the air pressure is defined by the fixed relative areas of the two interacting pistons in contact with the two fluids. A pressure sensor 82 senses the pressure within the delivery line 72 and regulates the pressure within the air cylinder 62. It will be appreciated by those skilled in the art that other equivalent devices could be constructed to create a pulse pump assembly 50 that could deliver a pulse of cryogenic liquid 24 through stretch rod valve assembly 74 during a predetermined time interval beginning at a preselected time after formation of the container 80 within the blow mold 78.

The stretch rod valve assembly 74 includes a two-seal valve 84 connecting the delivery line 72 to the stretch rod 76 and to an exhaust vent 86. A valve air cylinder 88 is connected to the two-seal valve 84 so that the air cylinder operates the two-seal valve. A control such as a programmable logic controller or personal computer 90 is coupled to the valve air cylinder 88, the pulse pump air cylinder 62, and the upper proximity switch 64. The control 90 can be an integral portion of a control for the stretch blow molding apparatus 20, and in any event must be sufficiently integrated to coordinate the delivery of the desired amount of cryogenic liquid 24 at a preselected time after each plastic parison is transformed into a container 80 by the stretch blow molding apparatus 20.

In order to assure that cryogenic liquid 24, rather than a cryogenic gas, is delivered into the container 80, a vacuum jacket member 77 is disposed generally surrounding reciprocable stretch rod 76. Similarly, to minimize losses and to assure that cryogenic liquid 24 at the preselected temperature and pressure is delivered into the container 80, a vacuum jacket casing 28 can be provided generally surrounding reservoir 12. A similar vacuum jacket casing 48 also surrounds pulse pump assembly 50 and the stretch rod valve assembly 74. A similar vacuum jacket casing 44 is also provided to surround subcooler 16. In addition, a vacuum jacket casing 46 is also disposed generally surrounding transfer line 14, return line 22, level control line 42, and supply line 52.

In use, after a heated parison, shown in phantom in FIG. 2, is placed in blow mold 78, the blow nozzle 79 is inserted into the open neck of the parison. The stretch rod 76 is then extended through the center of the blow nozzle 79 stretching the parison to the full length of the blow mold 78 at the same time as the parison is inflated by blow air from the blow nozzle 79 thereby forming the container 80. After a preselected time subsequent to formation of the container has elapsed, control 90 causes pulse pump assembly 50 to activate, thereby delivering a pulse of cryogenic liquid 24 into the container 80 for rapid, uniform, and efficient cooling of the container. Thereafter, stretch rod 76 is withdrawn from the container 80, to a retracted position, not shown, and the container 80 is removed from the blow mold 78 which is then ready to receive another parison to repeat the process.

The control 90, in coordination with the inflation of the parison with the blow mold 78, causes the pump air cylinder 62 to move the plunger 60 from a lowermost position to an upper most position as determined by the adjustable proximity switch 64 thus drawing into the pump cylinder 56 a specified quantity of cryogenic liquid from the surrounding liquid chamber 54 through inlet valve 58, the cryogenic liquid being at a temperature determined by subcooler 16 and at a pressure determined by pressure control regulator 18. At a preselected time after the formation of the container 80 within blow mold 78, control 90 causes the pump air cylinder 62 to begin moving the plunger 60 downward which exerts a pressure on the cryogenic liquid 10 in pump cylinder 56 that closes inlet valve 58 and open flapper valve 70 to delivery line 72, the pressure being controlled by pressure sensor 82 at a level greater than that set by pressure control regulator 18. At or about the same time that plunger 60 strokes downward, control 90 causes valve air cylinder 88 to open the two-seal valve 84 so that the pulse of cryogenic liquid 24 can flow from the pump cylinder 56 into the container 80 through stretch rod 76. After a preselected time interval set by control 90, during which cryogenic liquid 24 is flowing from the pump cylinder 56 into the container 80, the control 90 causes valve air cylinder 88 to close the two-seal valve 84 to stop the flow into the container 80 and vent any residual liquid or gaseous cryogen inside the stretch rod 76 out through exhaust vent 86.

In a most preferred embodiment, a pulse of cryogenic liquid 24 is delivered within the container during a time interval of about 0.1 seconds to about 2.0 seconds, beginning between about 0.0 seconds to about 1.0 seconds after formation of the container 80. The pulse of cryogenic liquid 24 is delivered at a preselected temperature between about −200° C. and about −170° C., and at a preselected pressure between about 10 bar and 50 bar. The amount of cryogenic liquid 24 used in a pulse is related to the amount of polymer used to form the container 80. For a 64 oz. hot-fill PET container formed from an 85 gram parison, a pulse of about 60 ml. is sufficient to cool the formed container.

The present invention having been described in its preferred embodiment, it is clear that the present invention is susceptible to numerous modifications and embodiments within the ability of those skilled in the art and without exercise of the inventive faculty. Accordingly, the scope of the present invention is defined as set forth by the scope of the following claims.

What is claimed is:

1. In a stretch blow molding apparatus having a mold, a blow nozzle for introducing air to inflate a parison within the mold, and a stretch rod reciprocally movable with respect to the blow nozzle for stretching the parison located within the mold during the inflation the parison to form a container, and a cryogenic liquid reservoir, the improvement comprising:
   a cryogenic liquid pulse pump assembly disposed in sealed fluid connection between the reservoir and the stretch rod; and
   control means for controlling the pulse pump assembly to deliver a preselected amount of cryogenic liquid at a preselected pressure and temperature into the container through the stretch rod during a predetermined time interval beginning at a preselected time after formation of the container.

2. The improvement of claim 1, wherein the cryogenic liquid pulse pump assembly comprises a cryogenic liquid containing chamber in sealed fluid connection to the reservoir and a variable volume pump situated within the chamber so as to be immersed in the cryogenic liquid, the variable volume pump including an inlet valve that allows a flow of cryogenic liquid from the liquid chamber into the pump cylinder.

3. The improvement of claim 1, wherein the cryogenic liquid pulse pump assembly comprises a variable volume pump having an outlet conduit in sealed fluid connection to the stretch rod, a pressure source for applying a pressure to the cryogenic liquid to cause an outflow of cryogenic liquid from the variable volume pump into the outlet conduit, and a pressure sensor coupled to the outlet conduit and to the pressure source for controlling the pressure of the outflowing cryogenic liquid.

4. The improvement of claim 1, wherein the cryogenic liquid pulse pump assembly comprises a variable volume pump, and the control means comprises a detector adjustably positionable with respect to the variable volume pump for detecting displacement of an element of the pump reflecting the displacement of a preselected volume of cryogenic liquid by the pump.

5. The improvement of claim 1, wherein the cryogenic liquid pulse pump assembly comprises a variable volume pump having an outlet conduit, and the control means comprises a valve connecting the outlet conduit in sealed fluid connection to the stretch rod, and a timer for opening the valve for said predetermined time interval beginning at said preselected time after formation of the container.

6. The improvement of claim 5, wherein the predetermined time interval is between about 0.1 seconds to about 2.0 seconds.

7. The improvement of claim 5, wherein the preselected time is between about 0.0 seconds and 1.0 seconds after formation of the container.

8. The improvement of claim 1, further comprising a subcooler disposed in sealed fluid connection between the reservoir and the pulse pump assembly for supplying cryogenic liquid to the pulse pump assembly at a preselected temperature.

9. The improvement of claim 8, wherein the subcooler comprises a supply line connecting the reservoir and the pulse pump assembly having a heat transfer portion, an envelope surrounding the heat transfer portion and including an inlet in sealed fluid connection to the reservoir, and a valve connected to the inlet for maintaining a level of cryogenic liquid within the envelope sufficient to bathe the heat transfer portion of the supply line.

10. The improvement of claim 1, further comprising a vacuum jacket casing disposed generally surrounding the stretch rod, the reservoir, and the pulse pump assembly for preventing vaporization of cryogenic liquid prior to delivery into the container.

11. In a stretch blow molding apparatus having a mold, a blow nozzle for introducing air to inflate a parison within the mold, and a stretch rod reciprocally movable with respect to the blow nozzle for stretching the parison located within the mold during the inflation the parison to form a container, and a cryogenic liquid reservoir, the improvement comprising:
   a cryogenic liquid pulse pump assembly disposed in sealed fluid connection between the reservoir and the stretch rod a cryogenic liquid containing chamber in sealed fluid connection to the reservoir, a variable volume pump situated within the chamber so as to be immersed in the cryogenic liquid, the variable volume pump including an inlet valve that allows a flow of cryogenic liquid from the liquid chamber into the pump cylinder and an outlet conduit in sealed fluid connection to the stretch rod, and a pressure source for applying a pressure to the cryogenic liquid to cause an outflow of cryogenic liquid from the variable volume pump into the outlet conduit; and
   control means including a pressure sensor coupled to the outlet conduit and to the pressure source for controlling the pressure of the outflowing cryogenic liquid, a detector adjustably positionable with respect to the variable volume pump for detecting displacement of an element of the pump reflecting the delivery of a preselected volume of cryogenic liquid by the pump.

12. The improvement of claim 11, wherein the cryogenic liquid pulse pump assembly comprises an outlet conduit coupled to the variable volume pump, and the control means comprises a timed valve connecting the outlet conduit in sealed fluid connection to the stretch rod, and a timer for opening the valve for a predetermined time interval beginning at a preselected time after formation of the container.

13. The improvement of claim 12, further comprising a vacuum jacket member disposed generally surrounding the stretch blow rod for preventing vaporization of cryogenic liquid flowing through the stretch blow rod prior to delivery into the container, and an exhaust port coupled to said timed valve to vent any residual liquid or gaseous cryogen inside the stretch rod subsequent to said predetermined time interval.

14. The improvement of claim 11, further comprising a subcooler including a supply line connecting the reservoir and the pulse pump assembly having a heat transfer portion, an envelope surrounding the heat transfer portion and including an inlet in sealed fluid connection to the reservoir, and a valve connected to the inlet for maintaining a level of cryogenic liquid within the envelope sufficient to bathe the heat transfer portion of the supply line to supply cryogenic liquid to the pulse pump at a preselected temperature.

15. In a stretch blow molding apparatus having a mold, a blow nozzle for introducing air to inflate a parison within the mold, and a stretch rod reciprocally movable with respect to the blow nozzle for stretching the parison located within the mold during the inflation the parison to form a container, and a cryogenic liquid reservoir, the improvement comprising:

a cryogenic liquid pulse pump assembly disposed in sealed fluid connection between the reservoir and the stretch rod a cryogenic liquid containing chamber in sealed fluid connection to the reservoir, a variable volume pump situated within the chamber so as to be immersed in the cryogenic liquid, the variable volume pump including an inlet valve that allows a flow of cryogenic liquid from the liquid chamber into the pump cylinder and an outlet conduit including a valve in sealed fluid connection to the stretch rod, and a pressure source for applying a pressure to the cryogenic liquid to cause an outflow of cryogenic liquid from the variable volume pump into the outlet conduit; and control means including a timer for opening the valve in sealed fluid connection to the stretch rod for a predetermined time interval beginning at a preselected time after formation of the container, and a pressure sensor coupled to the outlet conduit and to the pressure source for controlling the pressure of the outflowing cryogenic liquid, a detector adjustably positionable with respect to the variable volume pump for detecting displacement of an element of the pump reflecting the delivery of a preselected volume of cryogenic liquid by the pump during said predetermined time interval.

16. The improvement of claim 11, wherein the variable volume pump comprises a pump cylinder and a piston movable within the cylinder to change the volume of cryogenic liquid contained within the variable volume pump, and the pressure source comprises a pneumatic cylinder coupled to the piston for causing movement of the piston within the cylinder.

17. The improvement of claim 16, further comprising a subcooler including a supply line connecting the reservoir and the pulse pump assembly having a heat transfer portion, an envelope surrounding the heat transfer portion and including an inlet in sealed fluid connection to the reservoir, and a valve connected to the inlet for maintaining a level of cryogenic liquid within the envelope sufficient to bathe the heat transfer portion of the supply line, a temperature sensor for measuring the temperature of the cryogenic liquid within the subcooler, a vent and a control valve for the vent connected to the temperature sensor for controlling the venting of gaseous cryogen through the vent to regulate the pressure within the subcooler and thus the temperature of the cryogenic liquid within the subcooler so as to supply cryogenic liquid to the pulse pump assembly at a preselected temperature.

18. In a method of stretch blow molding an article, the method having stretch blow molding and cooling steps wherein during the stretch blow molding step a container is formed within a mold by stretching and inflating a parison with a reciprocally movable stretch rod, and during the cooling step a cooling liquid is introduced from a cooling liquid reservoir through the stretch rod into the container to cool the container, the improvement comprising:

producing the cooling liquid by supplying the cryogenic liquid to a pulse pump disposed in sealed fluid connection between the reservoir and the stretch blow rod; and controlling the pulse pump to deliver the cryogenic liquid at a preselected pressure of between about 10 bar and 50 bar into the container through the stretch blow rod during a predetermined time interval of about 0.1 seconds to about 2.0 seconds beginning at a preselected time between about 0.0 seconds to about 1.0 seconds after formation of the container.

19. The improvement of claim 18, further comprising the step of supplying cryogenic liquid to the pulse pump at a preselected temperature of between about −200° C. to about −170° C.

20. The improvement of claim 19, further comprising the step of delivering the cryogenic liquid into the container in an amount equal to about 0.7 ml/gm weight of polymer forming the container.

* * * * *